(12) United States Patent
Mattar et al.

(10) Patent No.: US 10,848,805 B1
(45) Date of Patent: Nov. 24, 2020

(54) CONTEXTUAL VIDEO RECOMMENDATIONS WITHIN A VIDEO GAME

(71) Applicant: Electronic Arts Inc., Redwood City, CA (US)

(72) Inventors: Mohamed Marwan Abdel Magid Mattar, San Francisco, CA (US); Bhargav Rajendra, Belmont, CA (US); Mohsen Sardari, Redwood City, CA (US); John Kolen, Half Moon Bay, CA (US); Navid Aghdaie, Redwood City, CA (US); Kazi Atif-Uz Zaman, Redwood City, CA (US); Kenneth Alan Moss, Redwood City, CA (US)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 15/938,849

(22) Filed: Mar. 28, 2018

(51) Int. Cl.
| | |
|---|---|
| *H04N 21/25* | (2011.01) |
| *H04N 21/258* | (2011.01) |
| *G06T 7/136* | (2017.01) |
| *G06F 16/735* | (2019.01) |
| *H04N 21/81* | (2011.01) |
| *H04N 21/472* | (2011.01) |
| *G06T 7/11* | (2017.01) |
| *G06F 16/78* | (2019.01) |

(52) U.S. Cl.
CPC ......... *H04N 21/251* (2013.01); *G06F 16/735* (2019.01); *G06T 7/136* (2017.01); *H04N 21/25891* (2013.01); *H04N 21/47202* (2013.01); *H04N 21/8173* (2013.01); *G06F 16/7867* (2019.01); *G06T 7/11* (2017.01)

(58) Field of Classification Search
CPC .......... H04N 21/251; H04N 21/25891; H04N 21/47202; H04N 21/8173; G06T 7/136; G06T 7/11; G06F 16/735; G06F 16/7867
See application file for complete search history.

(56) References Cited

U.S. PATENT DOCUMENTS

| | | | | |
|---|---|---|---|---|
| 8,706,675 B1 * | 4/2014 | Samaniego | ........ | G06Q 30/0201 706/52 |
| 2013/0167180 A1 * | 6/2013 | Georgescu | ......... | H04N 21/8455 725/93 |

(Continued)

*Primary Examiner* — Pankaj Kumar
*Assistant Examiner* — Alexander Boyd
(74) *Attorney, Agent, or Firm* — McDermott Will & Emery LLP

(57) ABSTRACT

Methods for providing contextual video recommendations within a video game are provided. In one aspect, a method includes executing an application that uses a rendering engine. The method also includes determining that a video recommendation threshold has been met. The method also includes providing a current contextual state of the application to a server such that the server selects a video from a plurality of videos based on the provided current contextual state and an index, wherein the index includes output from a vision model applied on the plurality of videos, and wherein the vision model is trained on footage generated by the rendering engine. The method also includes receiving a reference to the selected video from the server. The method also includes providing for display, via the reference, the selected video within a user interface of the application. Systems and machine-readable media are also provided.

18 Claims, 7 Drawing Sheets

(56) References Cited

U.S. PATENT DOCUMENTS

| | | | |
|---|---|---|---|
| 2014/0195648 A1* | 7/2014 | Hamada | H04L 29/08081 |
| | | | 709/219 |
| 2016/0071182 A1* | 3/2016 | Nogues | G06F 16/435 |
| | | | 705/26.7 |
| 2016/0366483 A1* | 12/2016 | Joyce | H04N 21/4622 |
| 2017/0001116 A1* | 1/2017 | Okamura | A63F 13/49 |
| 2017/0282073 A1* | 10/2017 | Kurabayashi | H04N 21/258 |
| 2018/0114096 A1* | 4/2018 | Sen | G06N 3/084 |

\* cited by examiner

CONTEXTUAL VIDEO RECOMMENDATIONS WITHIN A VIDEO GAME

TECHNICAL FIELD

The present disclosure generally relates to content discovery, and more specifically relates to contextual video recommendations within a video game.

BACKGROUND

Video sharing and streaming services are tools that enable users to become their own content creators. In particular, user generated video content related to video games has increased in popularity, allowing viewers to choose from a wide variety of helpful and entertaining content including tutorials, playthroughs, replays, reviews, commentary, reactions, quick takes, video blogs, and more. This video content can help maintain engagement with users and can also provide useful feedback and analytics for developers. However, video content discovery often occurs solely in the context of the video sharing or streaming service itself, limiting discovery opportunities. Further, searches often use high level keywords that may not provide optimal matches. As a result, the video sharing and streaming services may be inefficiently utilized.

The description provided in the background section should not be assumed to be prior art merely because it is mentioned in or associated with the background section. The background section may include information that describes one or more aspects of the subject technology.

SUMMARY

The disclosed system provides contextual video recommendations within an application such as a video game. Because a developer may have access to a rendering engine for an application, the developer can use the same engine to generate training footage that is annotated with contextual state information such as application name, in-game locations, character models, items, actions, animations, messages, player statistics, and other information. A vision model may be trained with the footage to recognize contextual state information from video content, and the vision model may in turn be used to index user generated video content, e.g., from external sources such as video sharing or streaming services. When a user runs the application, the application may present video suggestions at opportune times by searching the indexed video content based on the current contextual state information of the application.

According to certain aspects of the present disclosure, a computer-implemented method is provided. The method includes executing an application that uses a rendering engine. The method also includes determining that a video recommendation threshold has been met. The method also includes providing a current contextual state of the application to a server such that the server selects a video from a plurality of videos based on the provided current contextual state and an index, wherein the index includes output from a vision model applied on the plurality of videos, and wherein the vision model is trained on footage generated by the rendering engine. The method also includes receiving a reference to the selected video from the server. The method also includes providing for display, via the reference, the selected video within a user interface of the application.

According to certain aspects of the present disclosure, a system is provided including a memory, and a processor configured to execute instructions. When executed, the instructions cause the processor to execute an application that uses a rendering engine. The instructions also cause the processor to determine that a video recommendation threshold has been met. The instructions also cause the processor to provide a current contextual state of the application to a server such that the server selects a video from a plurality of videos based on the provided current contextual state and an index, wherein the index includes output from a vision model applied on the plurality of videos, and wherein the vision model is trained on footage generated by the rendering engine and annotated with contextual states. The instructions also cause the processor to receive a reference to the selected video from the server. The instructions also cause the processor to provide for display, via the reference, the selected video within a user interface of the application.

According to certain aspects of the present disclosure, a non-transitory machine-readable storage medium is provided that includes machine-readable instructions for causing a processor to execute a method. The method includes executing an application that uses a rendering engine, wherein the application is a video game. The method also includes determining that a video recommendation threshold has been met. The method also includes providing a current contextual state of the application, including a user account associated with the application, to a server such that the server selects a video from a plurality of videos based on the provided current contextual state and an index, wherein the index includes output from a vision model applied on the plurality of videos, and wherein the vision model is trained on footage generated by the rendering engine and annotated with contextual states. The method also includes receiving a reference to the selected video from the server. The method also includes providing for display, via the reference, the selected video within a user interface of the application.

According to certain aspects of the present disclosure, a method is provided. The method includes receiving a current contextual state of an application from a client executing the application, wherein the application uses a rendering engine. The method also includes accessing an index that includes output from a vision model applied on a plurality of videos, wherein the vision model is trained on footage generated by the rendering engine. The method also includes selecting a video from the plurality of videos based on the received current contextual state and the index. The method also includes providing a reference to the selected video to the client.

According to certain aspects of the present disclosure, a system is provided. The system includes a means for executing an application that uses a rendering engine, and for determining that a video recommendation threshold has been met. The system also includes a means for providing a current contextual state of the application to a server such that the server selects a video from a plurality of videos based on the provided current contextual state and an index, wherein the index includes output from a vision model applied on the plurality of videos, and wherein the vision model is trained on footage generated by the rendering engine, and for receiving a reference to the selected video from the server. The system also includes a means for displaying, via the reference, the selected video within a user interface of the application.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
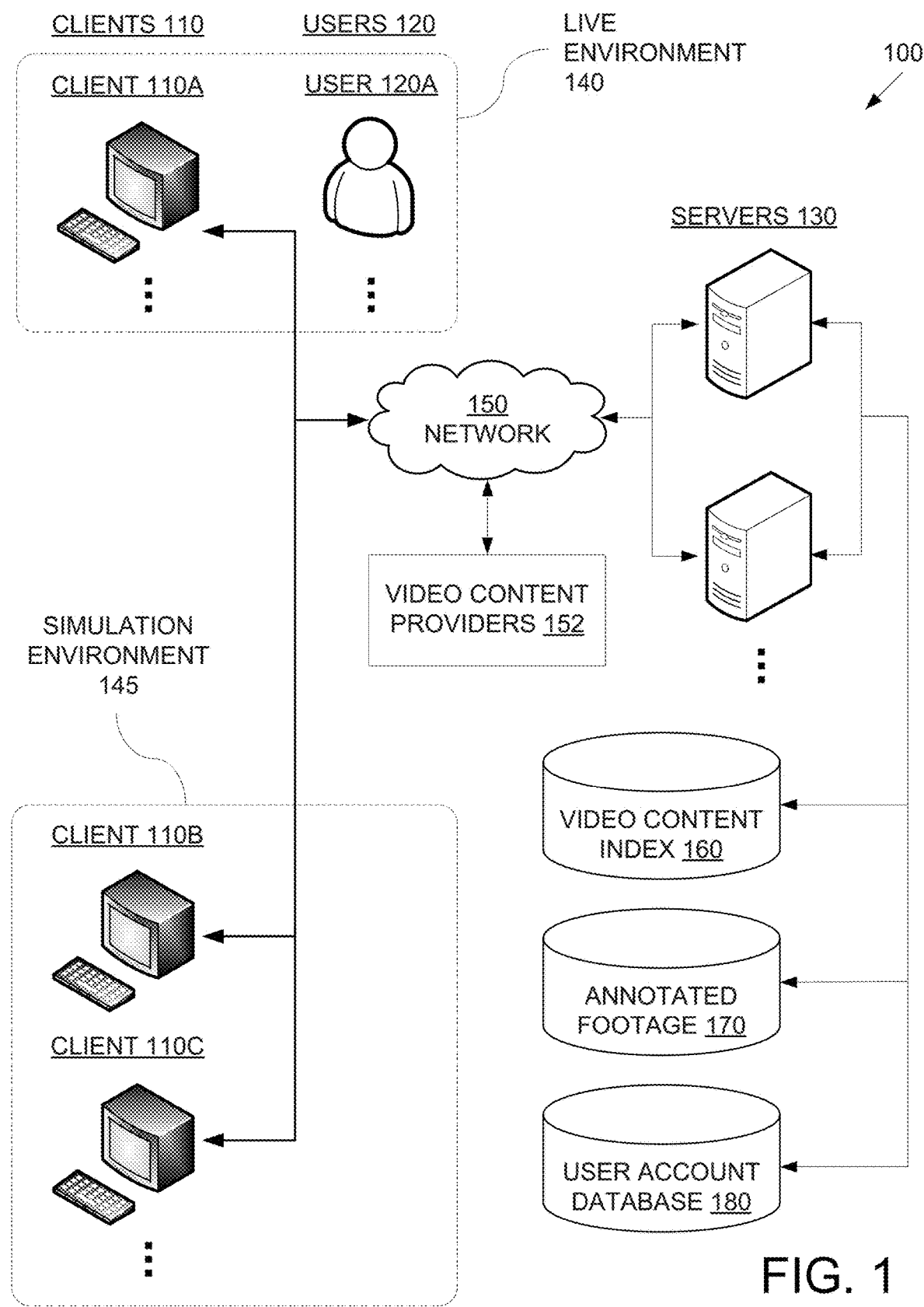
FIG. 1 illustrates an example architecture for providing contextual video recommendations within a video game.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.
General Overview As discussed above, video sharing and streaming services can provide a wide variety of helpful and entertaining content, but discovery of relevant content is often limited to interacting directly with the service itself. As a result, opportunities may be missed to view highly relevant, useful, and entertaining video content. Accordingly, a method of providing increased opportunities for discovering relevant video content is needed.

The disclosed system provides contextual video recommendations within an application such as a video game. A rendering engine for the application may be used to generate training footage that is annotated with contextual state information. A vision model may be trained with the footage to recognize contextual state information from video content. The vision model may be used to index user generated video content from video sharing or streaming services. When a user runs the application, the application may present video suggestions at opportune times by searching the indexed video content based on the current contextual state information of the application.

The disclosed system addresses a technical problem tied to computer technology and arising in the realm of computer networks, namely the technical problem of providing contextual video recommendations related to current application state. This is a technical problem related to networked content search, or more specifically related to analyzing and searching a large corpus of videos in an efficient manner to provide relevant contextual video recommendations. The disclosed system solves this technical problem with a technical solution, namely by generating context annotated training footage using a renderer from the application, training a vision model with the footage, and indexing videos from a video sharing or streaming service using the vision model. The indexed videos can then be readily searched against a current application state of the application to select a video recommendation. In this manner, contextual video recommendations can be provided that are highly relevant to the current application state while leveraging a rich library of user generated content already available on various video sharing services. The index may also be periodically updated to index new video uploads or to integrate updated training of the vision model. Further, by leveraging the preprocessed index, analysis of the video corpus can be avoided at search time, thereby reducing memory footprint, processor cycles, and network bandwidth usage. Accordingly, functioning of the computer itself is improved by using computational resources in an efficient manner.

Although certain examples provided herein may describe a user's account data being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.
Example System Architecture FIG. 1 illustrates an example architecture 100 for contextual video recommendations within a video game. The architecture 100 includes clients 110 and servers 130 connected over a network 150. Servers 130 may access various data stores including video content index 160, annotated footage 170, and user account database 180, for example over a local intranet. In some aspects of the subject technology, servers 130 may instead access the data stores over network 150. Users 120 may interact with respective clients 110. Client 110A may be part of live environment 140, whereas client 110B and 110C may be part of simulation environment 145. Additional clients and associated users may be included that are not specifically shown in FIG. 1. The clients 110 may each execute a separate instance of an application, such as a video game. The clients in simulation environment 145 may be real or virtualized clients, and may be under the control of a publisher or developer of the application. The clients in live environment 140 may correspond to clients associated with end users of the application, and may execute pre-release or release versions of the application.

Initially, a number of preprocessing steps may be executed to generate metadata for accelerated processing of contextual video searches. Each client in simulation environment 145 may be configured to execute a simulation run for an associated application instance. The simulation run may be fully automated without user intervention, semi-automated, or manually controlled. Renderer output for the application instance performing the simulation run may be video captured and annotated with contextual state from the application. The resulting training footage may then be stored in annotated footage 170. A vision model may then be trained using annotated footage 170, for example by using machine learning techniques. As a result, the vision model is configured to recognize application specific contextual states from arbitrary video footage. A video crawler may use the vision model to crawl through videos of video content providers 152 to generate video content index 160.

As new content is added to the application or existing content is modified, the vision model may become out of date. Similarly, the videos available from video content providers 152 may change day to day as new videos are uploaded or existing videos are updated or removed. Accordingly, the preprocessing steps described above may be periodically repeated, incrementally or in full, to update one or more metadata resources such as video content index 160, annotated footage 170, and the vision model.

The application instances for each client in live environment 140 may include a video recommendation module that provides contextual video recommendations within a user interface of the application. By sending a current contextual state to a recommendation service hosted on servers 130, the recommendation service can initiate a search on one or more video content providers 152 for a video recommendation based on the received current contextual state and video content index 160. The recommendation service may also consider other data sources to merge into the current contextual state. For example, user account database 180 may be queried for a history of user interactions with the application and with other applications. Non-user specific data may also be considered, such as popularity, rating, and user engagement, which may be useful to provide initial recommendations while the user history is still relatively empty. Once a recommended video is selected, a reference to the selected video, for example a Uniform Resource Identifier (URI), may be provided back to the client. The client may then display, via the reference, the selected video within a user interface of the application.

The clients 110 can be any device having an appropriate processor, memory, and communications capability for executing the application. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

One of the many servers 130 is configured to host a recommendation service along with supporting services such as a vision model, a content crawler, an indexer, and a search service. For the purposes of load balancing, multiple servers 130 can host the recommendation service and supporting services. In certain aspects, one or more of the servers 130 can be a cloud computing server of an infrastructure-as-a-service (IaaS), and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
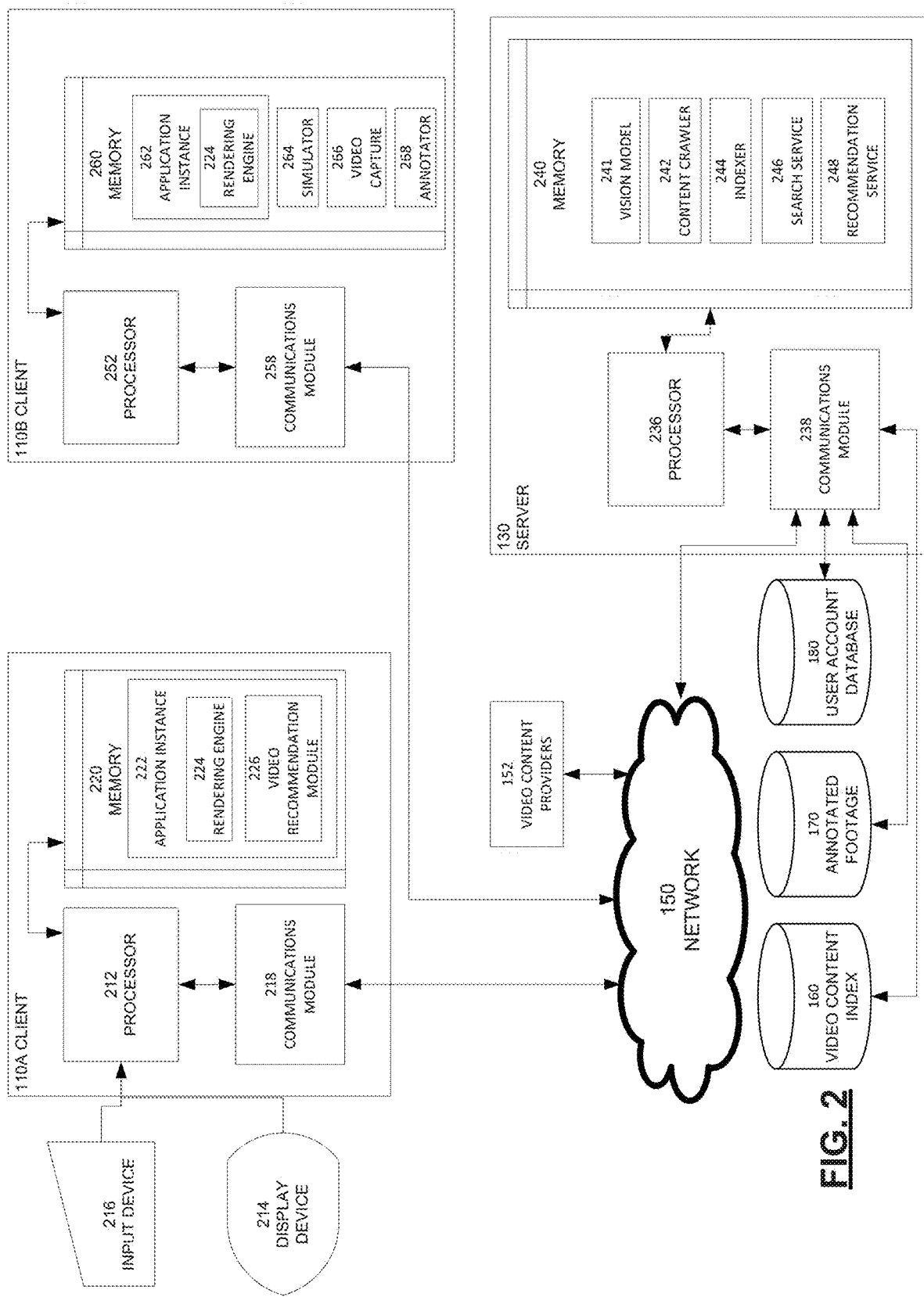
FIG. 2 is a block diagram illustrating the example clients and servers from the architecture of FIG. 1 according to certain aspects of the disclosure.

Example System for Providing Contextual Video Recommendations within a Video Game FIG. 2 is a block diagram illustrating an example server 130, client 110A and client 110B from the architecture of FIG. 1 according to certain aspects of the disclosure. The client 110A, client 110B, and server 130 are connected over the network 150 via respective communications modules 218, 258, and 238. The communications modules 218, 258, and 238 are configured to interface with the network 150 and to receive information, such as data, requests, responses, and commands to other devices on the network, such as video content providers 152, video content index 160, annotated footage 170, and user account database 180. The communications modules 218, 258, and 238 can be, for example, modems or Ethernet cards.

An end user client, or client 110A, is associated with user 120A and includes processor 212, communications module 218, and memory 220. The client 110A also includes an input device 216, such as a keyboard or mouse, and a display device 214. The processor 212 of the client 110A is configured to execute instructions, such as instructions physically coded into the processor 212, instructions received from software in memory 220, or a combination of both.

For example, the processor 212 of client 110A may execute application instance 222, corresponding to an instance of a video game application. Application instance 222 uses rendering engine 224 for rendering output for displaying on display device 214. Application instance 222 also uses video recommendation module 226 to determine that a video recommendation threshold has been met, and to provide a current contextual state of application instance 222 to server 130 such that server 130 selects a video from video content providers 152 based on the provided current contextual state and video content index 160, wherein video content index 160 includes output from vision model 241 applied on videos from video content providers 152, and wherein vision model 241 is trained on annotated footage 170 generated by rendering engine 224. Application instance 222 further uses video recommendation module 226 to receive a reference to the selected video from server 130, and to provide for display, via the reference, the selected video within a user interface of application instance 222.

In an aspect of the subject technology, the videos hosted on video content providers 152 include at least one of:

content generated by rendering engine 224, or real-world videos not generated by rendering engine 224. For example, the user generated content hosted on video content providers 152 may include portions of gameplay footage generated by rendering engine 224. However, some game genres such as sports games and open world games may have real life analogues to scenes, objects, characters, or other contextual state within the application. In this case, if the in-game models are rendered in a photorealistic fashion, the in-game models can be matched using vision model 241 to real footage of sporting matches, city landscapes, famous landmarks, or other real-world environments, persons, and events. For example, if a user performs an amazing in-game penalty kick with a player character based on a real world athlete, recommended videos may match to videos of similar penalty kicks actually performed by the real world athlete.

In an aspect of the subject technology, the current contextual state further identifies a user account in user account database 180 associated with application instance 222. For example, the user account may include user history data such as a breakdown of time spent playing particular modes or stages, a composition of the user's game or application library or wish list, whether the user has played other games by the same developer or in similar genres, whether the user had difficulty with certain sections, whether the user has linked accounts to third party social networks or video sharing services, and other information.

In an aspect of the subject technology, the video recommendation threshold includes the current contextual state including at least one of: unlocking an achievement, obtaining a rare item, ranking in a multiplayer match, receiving a particular level layout, or failing a task for a preset number of times. Thus, when these notable contextual events occur, a video suggestion may be presented to the user. For example, when the user unlocks an achievement, live streams of other users unlocking the same achievement may be recommended to the user. When the user obtains a rare item, reaction videos from other users obtaining the same rare item might be recommended to the user. When the user ranks in a multiplayer match, a replay of a match with a similar team composition but a different ranking outcome might be recommended to the user. When the user receives a particular level layout, for example a difficult puzzle layout, walkthrough videos for similar puzzle layouts may be recommended to the user. When the user fails a task for a preset number of times, such as performing a tricky maneuver or action, using new equipment or items effectively, or getting past a difficult area, a tutorial video may be recommended to the user that covers the same maneuver, action, equipment, item, area, etc.

In an aspect of the subject technology, the video recommendation threshold includes the user interface showing at least one of: a title screen, a loading screen, a transition screen, a game over screen, or a navigation screen. In this manner, periods of natural downtime may be used as opportunities to present context relevant video recommendations. The video recommendation threshold may also be modified by previous user interactions with video recommendations. For example, if the user frequently dismisses video recommendations, then the video recommendation threshold may be raised higher to trigger less often.

In an aspect of the subject technology, the current contextual state includes at least one of a game mode, a game type, a location, a player action, a player statistic, or a hardware configuration. Of course, these data points are only examples of contextual state. Any game state data from application instance 222 may be extracted as the current contextual state.

A simulation client, or client 110B, includes processor 252, communications module 258, and memory 260. The processor 252 of the client 110B is configured to execute instructions, such as instructions physically coded into the processor 252, instructions received from software in memory 260, or a combination of both. For example, the processor 252 of client 110B may execute application instance 262, corresponding to an instance of the video game application. As shown in FIG. 2, both application instance 222 and application instance 262 utilize the same rendering engine 224 for generating video output. Further, a number of support programs including simulator 264, video capture 266, and annotator 268 are provided to generate training footage for storing into annotated footage 170.

Simulator 264 may simulate user inputs for a fully automated or semi-automated simulation run of the video game provided by application instance 262. For example, levels of the video game may be traversed using prerecorded inputs, scripts, or artificial intelligence (AI). Alternatively, a quality assurance tester may manually simulate a run using an input device. In this case, the client 110B may include an input device, such as a keyboard or mouse, and a display device. Alternatively, client 110B may be accessed remotely by the quality assurance tester.

Video capture 266 may capture video output of application instance 262. For example, a recording application program interface (API) of a discrete or integrated graphic processor unit (GPU) may be utilized to record video output of application instance 262. Alternatively, a hardware based approach such as a video capture device may be utilized. In either case, video output of application instance 262 may be recorded to storage and optionally compressed in real-time or during post-processing. The video output may also include audio.

Annotator 268 may retrieve current contextual state from application instance 262, for example by using a developer or debugger API exposed by application instance 262. Annotator 268 may work in tandem with video capture 266 to annotate the recorded video according to a specified granularity, such as for every N frames at a particular framerate. The API may be disabled for end-user versions of the application, such as application instance 222. Alternatively, application instance 262 may first verify client membership in simulation environment 145 before exposing the API. Note that in this manner, the same application codebase can be used for both live environment 140 and simulation environment 145 by implementing an environment check or by using different compilation flags or other build settings. This may help reduce development time as a separate "simulation version" of the application does not need to be developed, although that approach is still an option.

Although not specifically shown in FIG. 2, other users and associated clients may also be in communication with servers 130 over network 150. The other clients may include components similar to those shown in client 110A and client 110B in FIG. 2.

Server 130 includes processor 236, communications module 238, and memory 240, which includes vision model 241, content crawler 242, indexer 244, search service 246, and recommendation service 248. The processor 236 of the server 130 is configured to execute instructions, such as instructions physically coded into the processor 236, instructions received from software in memory 240, or a combination of both.

For example, the processor 236 of the server 130 executes instructions in recommendation service 248 to receive a current contextual state of application instance 222 from client 110A executing application instance 222, wherein application instance 222 uses rendering engine 224. For example, video recommendation module 226 may provide the current contextual state of application instance 222 to server 130 via network 150.

Video content index 160 may be accessed. As discussed above, a number of preprocessing steps may be carried out to generate video content index 160. Annotated footage 170 may be used to train vision model 241 to recognize application specific contextual states. Content crawler 242 may crawl through videos hosted on video content providers 152. Indexer 244 may apply vision model 241 with videos retrieved by content crawler 242 to output video content index 160.

A video may be selected from video content providers 152 by using search service 246 with the received current contextual state. Search service 246 may use video content index 160 and other data sources such as user account database 180 to select the video.

A reference, such as a URI, to the recommended video selected by search service 246 may be provided back to client 110A. For example, the URI may point to a playback link for the selected video that is hosted on video content providers 152.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3A:
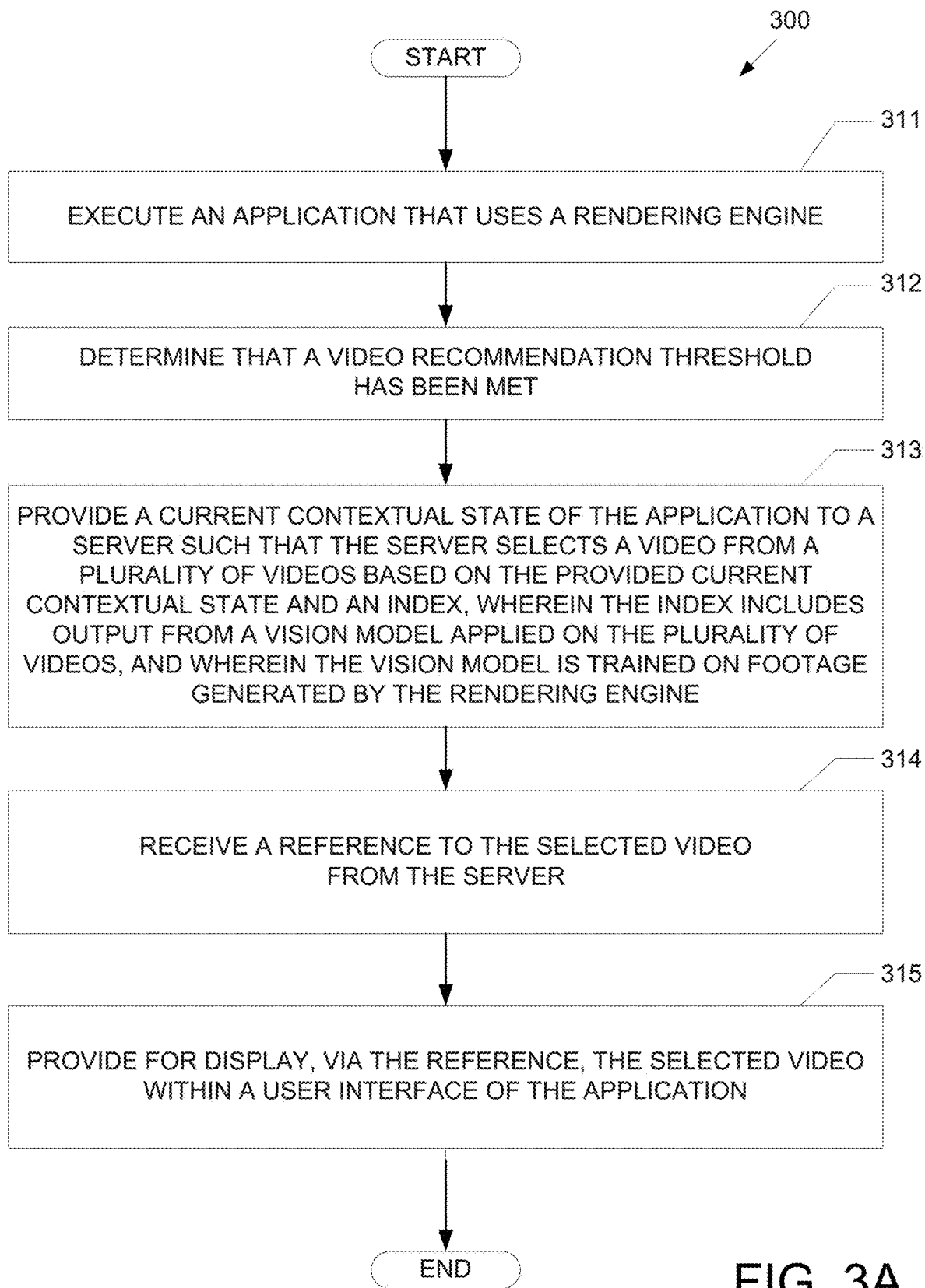
FIG. 3A illustrates an example process for providing contextual video recommendations within a video game using an example client of FIG. 2.

FIG. 3A illustrates an example process 300 for providing contextual video recommendations within a video game using the example client 110A of FIG. 2. While FIG. 3A is described with reference to FIG. 2, it should be noted that the process steps of FIG. 3A may be performed by other systems.

The process 300 begins by proceeding to step 311, where processor 212 of client 110A executes application instance 222 that uses a rendering engine 224. As discussed above, the simulation client or client 110B executes an application instance 262 that uses the same rendering engine 224. The application instance 222 may correspond to a video game.

In step 312, processor 212 determines that a video recommendation threshold has been met. For example, a calculated value may be compared to a threshold value to determine whether now is an opportune time to interrupt the user with a contextual video recommendation. A baseline default threshold value may be established for all users, which may be adjusted on a per user basis according to user interactions with the video recommendations. Further, certain contextual states or user interface states may affect the calculated value. As an example, user interface states that correspond to natural downtime during the application, such as game over, loading, or transition screens may increase the calculated value, whereas game states that require player concentration or involve a high risk/reward may decrease the calculated value.

In some aspects of the subject technology, the video recommendation threshold includes the current contextual state including at least one of: unlocking an achievement, obtaining a rare item, ranking in a multiplayer match, receiving a particular level layout, or failing a task for a preset number of times. As discussed above, these events may be good candidates for providing a contextual video recommendation.

In some aspects of the subject technology, the video recommendation threshold includes the user interface showing at least one of: a title screen, a loading screen, a transition screen, a game over screen, or a navigation screen. As discussed above, these user interface states may correspond to natural downtime during the application.

In some aspects of the subject technology, the video recommendation threshold is based on previous user interactions with video recommendations. For example, if the user frequently dismisses or closes video recommendations, then the video recommendation threshold may be adjusted upwards, whereas if the user engages with the video recommendations, then the video recommendation threshold may remain the same or be adjusted downwards.

In step 313, processor 212 provides a current contextual state of application instance 222 to server 130. In response, server 130 may select a video from video content providers 152 based on the provided current contextual state and video content index 160, wherein video content index 160 includes output from vision model 241 applied on the videos from video content providers 152, and wherein vision model 241 is trained on annotated footage 170 generated by rendering engine 224. The steps carried out by server 130 are described in greater detail in conjunction with FIG. 3B below.

As discussed above, preprocessing steps may be carried out to use simulation clients such as client 110B to generate annotated footage 170 from rendering engine 224. The vision model 241 is trained on the annotated footage 170 to recognize contextual state for application instance 222. Content crawler 242 may crawl through videos hosted on video content providers 152. Indexer 244 may apply vision model 241 with videos retrieved by content crawler 242 to output video content index 160. Search service 246 of server 130 may use video content index 160 and the provided current contextual state of application instance 222 to execute search queries for recommended videos hosted by video content providers 152.

In some aspects of the subject technology, the videos hosted on video content providers 152 may contain content rendered by rendering engine 224. For example, a user may record video portions generated by rendering engine 224, for example when the user is recording gameplay of an application instance. This gameplay footage may be processed with camera overlays and other effects and uploaded as a new video for video content providers 152.

In some aspects of the subject technology, the videos hosted on video content providers 152 may contain real-world videos not generated by rendering engine 224, wherein rendering engine 224 is photorealistic. For example, a camera or other device may be used to record footage of real world locations and events, which may be uploaded to video content providers 152. Since rendering engine 224 is photorealistic, vision model 241 may be enabled to match to real-world videos hosted on video content providers 152.

In some aspects of the subject technology, the current contextual state further identifies a user account associated with application instance 222. For example, information concerning the user account may be retrieved from user account database 180 and merged into the current contextual state.

In some aspects of the subject technology, the current contextual state includes at least one of a game mode, a game type, a location, a player action, a player statistic, or a hardware configuration. As discussed above, these are only examples and any game or application state may be retrieved from application instance 222.

In some aspects of the subject technology, vision model 241 may include an acoustic model for audio. For example, distinctive sounds, music, and spoken words may be recognized in audio tracks to provide additional contextual states.

In some aspects of the subject technology, vision model 241 may divide video frames into processing regions. For example, video frames may be divided into a grid of smaller elements such as 16 by 16 pixel boxes, or into relevance regions such as by Voronoi partitioning or other methods. These elements may then be individually analyzed using vision model 241, for example by converting each element into a set of vectors using a fixed number of dimensions to represent the visual semantic data within each element. In this manner, image searching or matching can be performed in smaller, highly localized portions, providing robustness against partial image obstruction, image warping, and other artifacts that may hinder recognition. Further, vision model 241 may apply perspective correction and warping, which may further use known camera parameters and other context available from rendering engine 224.

In some aspects of the subject technology, server 130 is accessed via network 150, and the reference to the selected video refers to video content providers 152 that are separate from server 130 and accessible via network 150, as shown in FIG. 2.

In step 314, processor 212 receives a reference to a selected video from server 130. For example, the reference may correspond to a URI pointing to a video hosted on video content providers 152. Note that the reference does not necessarily need to point to the beginning of the video. For example, if the relevant portion of the video does not start until the 10 minute mark, the reference may specify an offset to start at the 10 minute mark. Similarly, a long video may be shortened by only specifying relevant video clips in the reference. Thus, the reference may include start and end offsets. Note that the video clips may be selected to start earlier than the matched relevant video, for example to include relevant background information or audio commentary.

In step 315, processor 212 provides for display, via the reference, the selected video within a user interface of application instance 222. For example, the user interface may be output for display on display device 214, and a portion of the user interface may present the selected video as a recommended video by using the received reference. If the reference points to offsets or shorter clips within the video, user interface elements may be provided to allow the user to watch the entire video from the beginning, if desired by the user.

Figure 4A:
FIG. 4A, FIG. 4B, FIG. 4C and FIG. 4D illustrate example user interfaces for providing contextual video recommendations within a video game.

A number of example user interfaces for process 300 are illustrated in FIGS. 4A, 4B, 4C and 4D. For example, display device 214A of FIG. 4A illustrates a user interface displaying a game over screen, wherein a video recommendation is provided for "Gamer Joe's Winning Strategy! How to beat the Black Knight." For example, the current contextual state of application instance 222 may indicate that the user is on the third game over screen for the "Black Knight" boss character. As a result, the video recommendation is relevant for how to defeat the "Black Knight" boss character so that the user can progress in the game. Other criteria such as the popularity of "Gamer Joe" or the feedback or likes for the video may also be considered when selecting the video. While FIG. 4A only shows a single recommendation, multiple recommendation videos may also be displayed, for example by providing a scroll bar, by automatically switching or presenting a slideshow of different recommendation videos, or by providing other navigation elements.

When the user clicks on the video recommendation to initiate playback, the playback interface may vary depending on the particular application or video game. For example, in a massively multiplayer online (MMO) game or other game where the game cannot be paused and continues to operate in real-time, playback of the video may occur in a corner of the user interface or another unobtrusive location to avoid impacting gameplay. For a single player game where the player has more freedom to pause or step away from the game, playback may transition to full screen or occupy a significantly larger portion of the user interface.

Figure 4B:

FIG. 4B illustrates a display device 214B, which may display the user interface shown in display device 214A after the user clicks the "X" button in the corner to dismiss the video recommendations. As shown in display device 214B, an acknowledgement may be provided for the dismissal, and the user may be informed that the video recommendations will appear less often, for example by increasing the video recommendation threshold. However, to incentivize users to engage with the video recommendations, a reward may be provided upon viewing a recommended video, for example by providing in-game currency, items, or other rewards. Further, users may be given the opportunity to rate or comment on recommended videos, which may also be incentivized with rewards to help provide better recommendations.

Figure 4C:
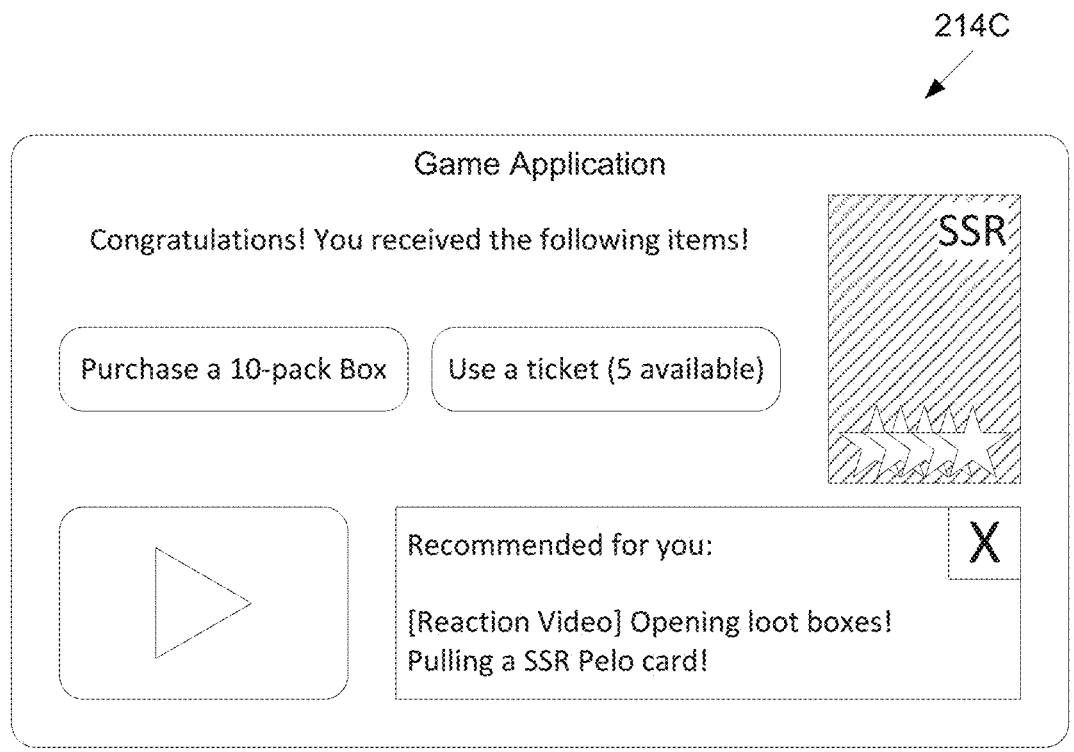

FIG. 4C illustrates a display device 214C, which may display a user interface displaying a rare item draw. As shown in display device 214C, the user has pulled a rare "SSR Pelo card." Since this item may be a very rare item, the user might be interested in other users that have pulled the same card. Thus, the recommended video corresponds to a reaction video of another user managing to pull the same "SSR Pelo card."

Figure 4D:
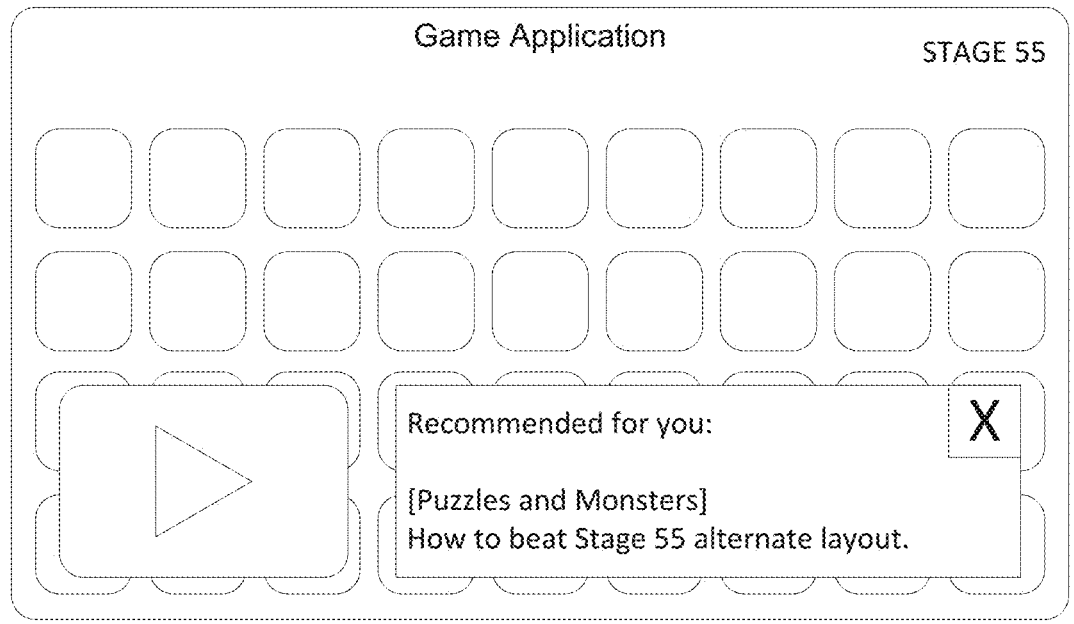

FIG. 4D illustrates a display device 214D, which may display a user interface displaying a stage in a particular configuration. As shown in display device 214D, a puzzle game is currently on stage 55 with a particular layout, which may be partially randomized for each user. Since this particular layout may be harder than a typical layout, a recommended video may provide pointers and tips on how to successfully clear a puzzle layout similar to the layout shown in display device 214D. Difficulty of the particular layout may be gauged, for example, by measuring successful completion rates from other users of the same application using a similar puzzle layout. Thus, recommended videos might only be presented when a particular puzzle layout is more challenging than usual. Of course, as discussed above, the user may also dismiss the recommended videos if the user prefers to solve the puzzles without outside help.

Besides video recommendations within a video game, the video content index 160 can also be used to support other applications such as diagnostics and feedback. For example, besides simulations of gameplay, simulation clients may also output all possible error messages and known or reproducible bugs, which can then be recognized using vision model 241. Thus, a user might be able to receive recommendations for fixing a particular error message that is shown, or how to mitigate a known bug or issue. Additionally, as discussed above, vision model 241 may include an acoustic model that can perform voice or speech recognition. Thus, review videos or commentary videos might be analyzed for user sentiment and feedback concerning game features, difficulty, character balance, and other elements.

This feedback may be provided to developers to continuously improve the application and integrate community feedback.

Figure 3B:
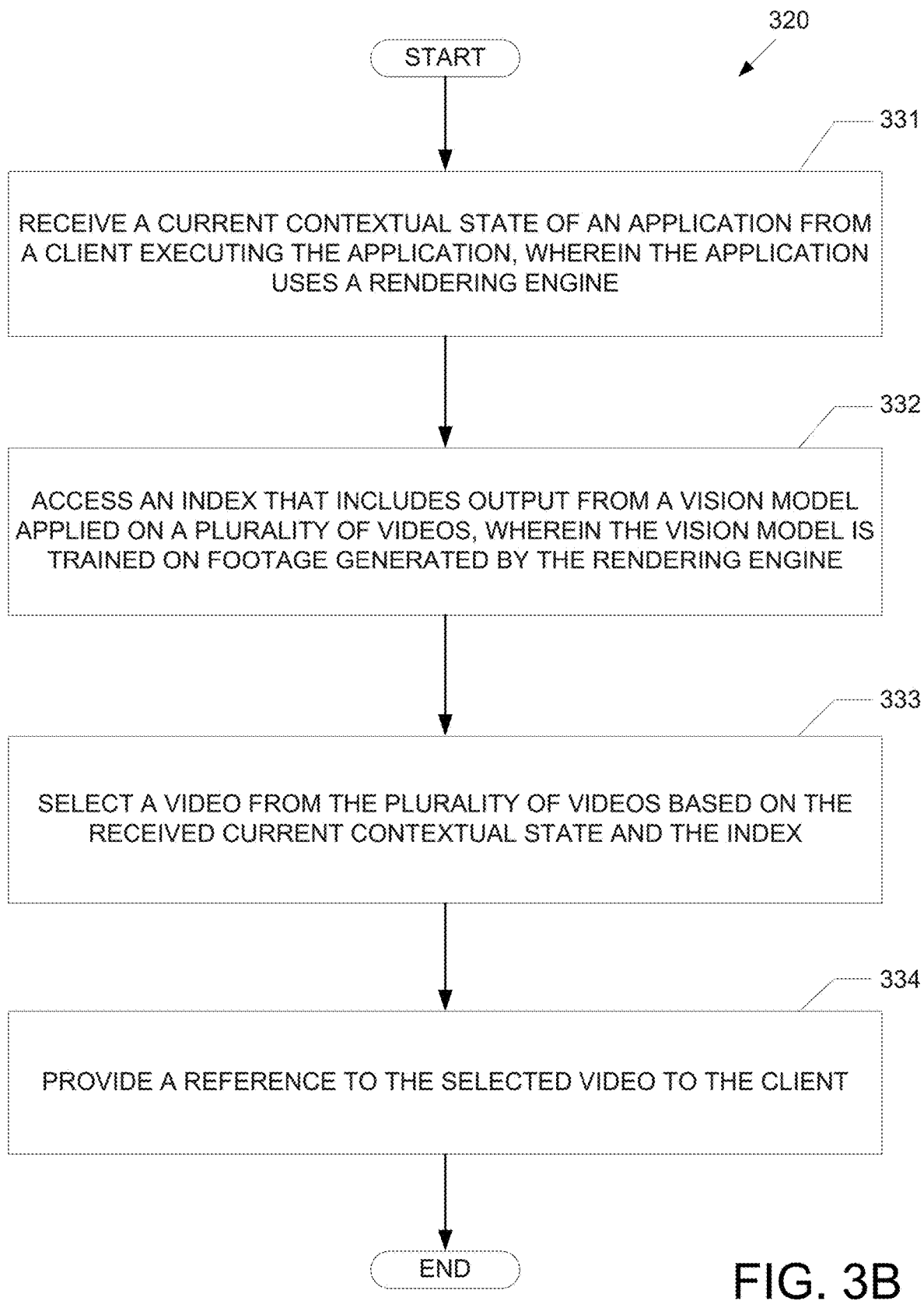
FIG. 3B illustrates an example process for providing contextual video recommendations within a video game using an example server of FIG. 2.

FIG. 3B illustrates an example process 320 for providing contextual video recommendations within a video game using the example server 130 of FIG. 2. While FIG. 3B is described with reference to FIG. 2, it should be noted that the process steps of FIG. 3B may be performed by other systems.

The process 320 begins by proceeding to step 331, where processor 236 of server 130 executes recommendation service 248 to receive a current contextual state of application instance 222 from client 110A executing application instance 222, wherein application instance 222 uses rendering engine 224. For example, this may correspond to processor 212 of client 110A performing step 313 to provide the current contextual state to server 130, as described above.

In step 332, processor 236 accesses video content index 160 that includes output from vision model 241 applied to videos hosted on video content providers 152, wherein vision model 241 is trained on annotated footage 170 generated by rendering engine 224. As discussed above, vision model 241 may be trained and video content index 160 and annotated footage 170 may be created using preprocessing steps with content crawler 242 and indexer 244.

In step 333, processor 236 selects a video from video content providers 152 based on the received current contextual state and video content index 160. For example, processor 236 may execute search service 246 to execute a search query using the received current contextual state and video content index 160.

In step 334, processor 236 provides a reference to the selected video to client 110A. For example, processor 236 may receive a result from search service 246 pointing to a particular video hosted on video content providers 152. Processor 236 executing recommendation service 248 may then format the result from search service 246 as a reference, such as a URI, that provides a playback of the particular video hosted on video content providers 152. Recommendation service 248 may provide the reference to client 110A over network 150.

Hardware Overview

Figure 5:
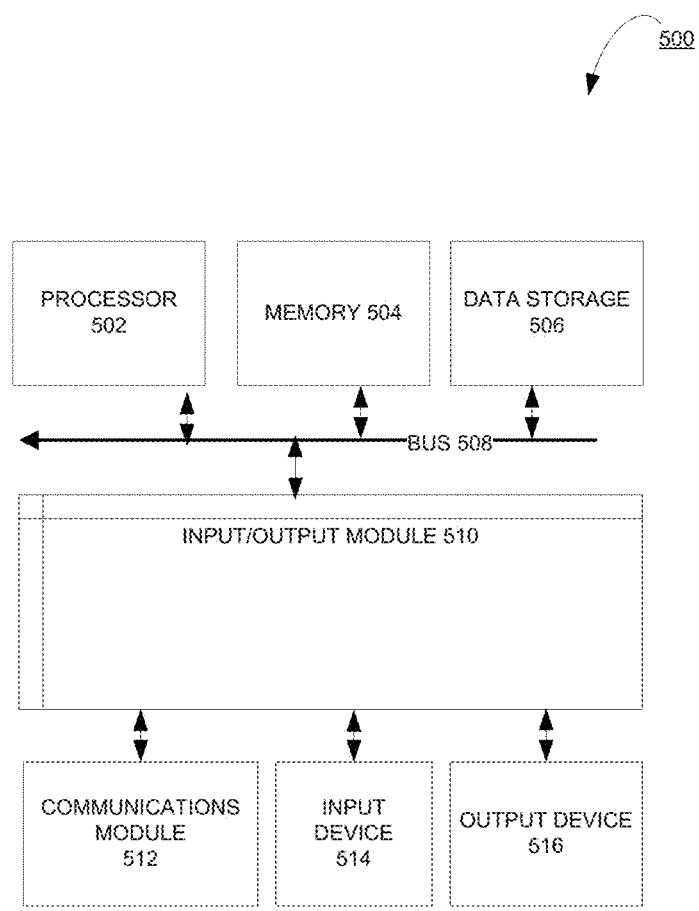
FIG. 5 is a block diagram illustrating an example computer system with which the clients and servers of FIG. 2 can be implemented.

FIG. 5 is a block diagram illustrating an example computer system 500 with which the client 110A, client 110B, and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A, client 110B, and server 130) includes a bus 508 or other communication mechanism for communicating information, and a processor 502 (e.g., processor 212, 252, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 260, and 240), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his)

include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing contextual video recommendations, the method comprising:
    executing an application that uses a rendering engine;
    determining that a video recommendation threshold has been met, the video recommendation threshold comprising a user interface showing at least one of: a title screen, a loading screen, a transition screen, or a navigation screen, the video recommendation threshold modified by previous user interactions with video recommendations;
    providing a current contextual state of the application to a server such that the server selects a video from a plurality of videos based on the provided current contextual state, a popularity of the selected video, and an index, wherein the index includes output from a vision model applied on the plurality of videos, wherein the contextual state identifies a user account associated with the application, the user account including user history data, and wherein the vision model is trained on footage generated by the rendering engine; and
    receiving a reference to the selected video from the server; and providing for display, via the reference, the selected video within the user interface of the application.

2. The method of claim 1, wherein the plurality of videos include content generated by the rendering engine.

3. The method of claim 1, wherein the rendering engine is photorealistic, and wherein the plurality of videos includes real-world videos not generated by the rendering engine.

4. The method of claim 1, wherein the vision model includes an acoustic model for audio.

5. The method of claim 1, wherein the current contextual state comprises at least one of a game mode, a game type, a location, a player action, a player statistic, or a hardware configuration.

6. The method of claim 1, wherein the video recommendation threshold comprises the current contextual state including at least one of: unlocking an achievement, obtaining a rare item, ranking in a multiplayer match, receiving a particular level layout, or failing a task for a preset number of times.

7. The method of claim 1, wherein the video recommendation threshold comprises the user interface showing a game over screen.

8. The method of claim 1, wherein the video recommendation threshold is based on previous user interactions with video recommendations.

9. The method of claim 1, wherein the vision model divides video frames into processing regions.

10. The method of claim 1, wherein the footage generated by the rendering engine is annotated with contextual states.

11. The method of claim 1, wherein the reference includes a start offset and an end offset for the selected video.

12. The method of claim 1, wherein the server is accessed via a network, and wherein the reference to the selected video refers to a video content provider that is separate from the server and accessible via the network.

13. A system for providing contextual video recommendations, the system comprising:
a memory; and
a processor configured to execute instructions which, when executed, cause the processor to:
execute an application that uses a rendering engine;
determine that a video recommendation threshold has been met, the video recommendation threshold comprising a user interface showing at least one of: a title screen, a loading screen, a transition screen, or a navigation screen, the video recommendation threshold modified by previous user interactions with video recommendations;
provide a current contextual state of the application to a server such that the server selects a video from a plurality of videos based on the provided current contextual state, a popularity of the selected video, and an index, wherein the index includes output from a vision model applied on the plurality of videos, wherein the contextual state identifies a user account associated with the application, the user account including user history data, and wherein the vision model is trained on footage generated by the rendering engine and annotated with contextual states; and
receive a reference to the selected video from the server; and provide for display, via the reference, the selected video within the user interface of the application.

14. The system of claim 13, wherein the plurality of videos include at least one of:
content generated by the rendering engine, or real-world videos not generated by the rendering engine.

15. The system of claim 13, wherein the video recommendation threshold comprises the current contextual state including at least one of:
unlocking an achievement, obtaining a rare item, ranking in a multiplayer match,
receiving a particular level layout, or failing a task for a preset number of times.

16. The system of claim 13, wherein the video recommendation threshold comprises the user interface showing a game over screen.

17. The system of claim 13, wherein the current contextual state comprises at least one of a game mode, a game type, a location, a player action, a player statistic, or a hardware configuration.

18. A non-transitory machine-readable storage medium comprising machine-readable instructions for causing a processor to execute a method for providing contextual video recommendations, comprising:
executing an application that uses a rendering engine, wherein the application is a video game;
determining that a video recommendation threshold has been met, the video recommendation threshold comprising a user interface showing at least one of: a title screen, a loading screen, a transition screen, or a navigation screen, the video recommendation threshold modified by previous user interactions with video recommendations;
providing a current contextual state of the application, including a user account associated with the application, to a server such that the server selects a video from a plurality of videos based on the provided current contextual state, a popularity of the selected video, and an index, wherein the index includes output from a vision model applied on the plurality of videos, wherein the contextual state identifies a user account associated with the application, the user account including user history data, and wherein the vision model is trained on footage generated by the rendering engine and annotated with contextual states; and
receiving a reference to the selected video from the server; and providing for display, via the reference, the selected video within the user interface of the application.

* * * * *